June 11, 1968    M. S. BIRD    3,387,588

CAGED ANIMAL MOVEMENT CONTROLLING DEVICE

Filed June 9, 1966

INVENTOR.
MERRILL S. BIRD
BY
Dick, Zarley, McKee & Thomte
ATTORNEYS

United States Patent Office 3,387,588
Patented June 11, 1968

3,387,588
CAGED ANIMAL MOVEMENT CONTROLLING
DEVICE
Merrill S. Bird, 1218 44th St.,
Des Moines, Iowa 50311
Filed June 9, 1966, Ser. No. 556,480
8 Claims. (Cl. 119—106)

ABSTRACT OF THE DISCLOSURE

An animal collar to preclude the animal's passage through openings of a predetermined size wherein the collar includes a plurality of outwardly extending radial projections on the outer edge thereof. Three projections are preferably used, one of which extends upwardly and the other two projections extend downwardly and outwardly away from the animal's legs which may move therebetween.

The handling of small animals such as chinchillas requires at times that the males and females be segregated. One of the more convenient methods of segregating the animals is by placing a collar on the animal's neck of such a size and shape that the animal cannot leave its compartment through the access passageway. The collar should be lightweight, no larger than necessary to restrict the animal's movement through the access passageway and have a shape that will not interfere with the animal's movement within its compartment and also of such a construction that it may be easily attached to and removed from the animal.

Therefore, one of the principal objects of this invention is to provide an animal movement controlling device which will prevent the animal from moving through an an access opening but otherwise will not interfere with the animal's normal activity.

It is a related object of this invention to provide an animal movement controlling device having a plurality of projections extending outwardly from the outer peripheral edge of the collar portion of the device and the projections are so spaced that they extend away from and out of the way of the animal's legs.

Yet another related object of this invention is to provide an animal movement controlling device having a center of gravity offset from the point on the device where it is supported on the animal's neck such that it will always rotate to a predetermined position as dictated by the relationship between the point of support and the center of gravity of the device.

A further object of this invention is to provide an animal movement controlling device having a collar shape and including a pivotal portion adapted to move between open and closed positions for providing access to the center of the device such that it may be mounted around the neck of an animal.

A related object of this invention is to provide an animal movement controlling device wherein the pivotal portion of the collar has a free end which forms a part of one of the outwardly extending projections on the collar and the inner end of the pivotal portion is connected to the collar member at a point on one of the radial lines extending through one of the other outwardly extending projections.

A still further object of this invention is to provide an animal movement controlling device having a relatively small in width collar but having outwardly extending projections on the periphery of the collar wherein the projections are substantially longer than the width of the collar.

Yet another object of this invention is to provide an animal movement controlling device including a collar member with three outwardly extending equally spaced apart projections wherein the device is mounted on an animal's neck it will gravitate to a position wherein two of the projections extend outwardly and downwardly away from the animal's legs and the third projection extends vertically upwardly whereby the animal may clearly move its legs between the two downwardly extending projections.

A further object of this invention is to provide an animal movement controlling apparatus which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figure 1:
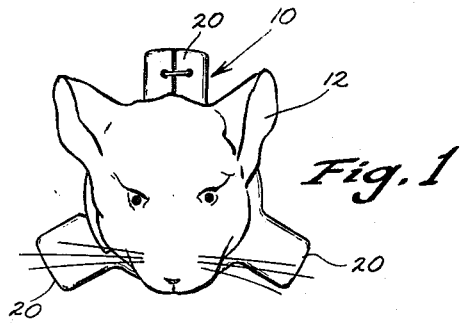
FIG. 1 is an elevational view of the device mounted on the neck of a chinchilla animal.

The animal collar device of this invention is referred to generally in FIG. 1 by the reference numeral 10 and is shown mounted on a chinchilla 12.

As seen in the drawings, the collar device 10 includes a collar member 14 having a center circular opening 16 and a circular outer edge 18. A trio of projections 20 which are equally spaced apart extend from the outer peripheral edge 18 and have a length extending from the outer peripheral edge which is substantially longer than the width of the collar 14 measured from its inner peripheral edge which defines the center opening 16.

Figure 2:
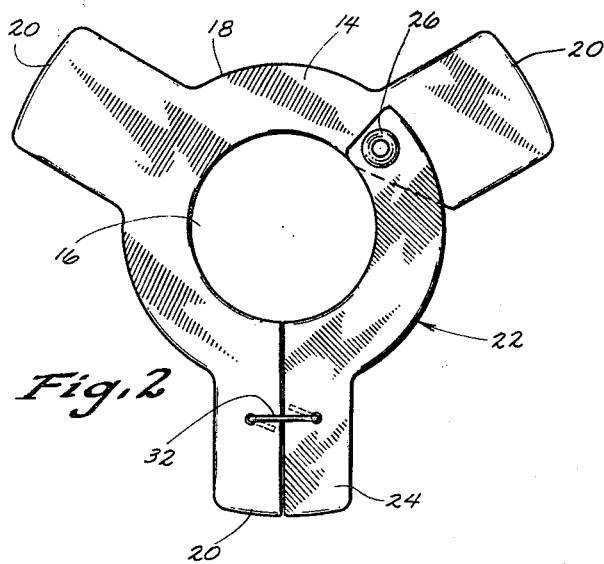
FIG. 2 is a plan view of the device with its pivotal portion in a closed position.
Figure 3:
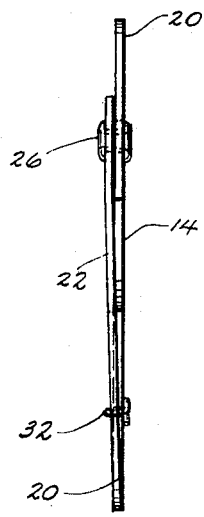
FIG. 3 is a side elevational view of the collar device of FIG. 2 taken from the right side.

One of the outwardly extending projections 20 is split along its longitudinal center to form a pivotal portion 22 which includes an outer free end 24 which when in its closed position as seen in FIG. 2 forms one-half of the projection 20. The other end of the pivotal portion 22 is pivotally connected by an eyelet 26 to the collar member 14 at a point on a longitudinal radial line extending through one of the other projections 20.

The split projection 20 includes adjacent holes 30 which are adapted to receive a staple 32 to maintain the pivotal portion 22 in its closed position as seen in FIG. 2.

The collar device is preferably constructed of a tough plastic material such as phenolic. When being used on chinchillas, a preferred thickness is one-sixteenth of an inch. To provide the plastic with additional flexibility and toughness, a piece of linen material is embodied in the plastic.

Figure 4:
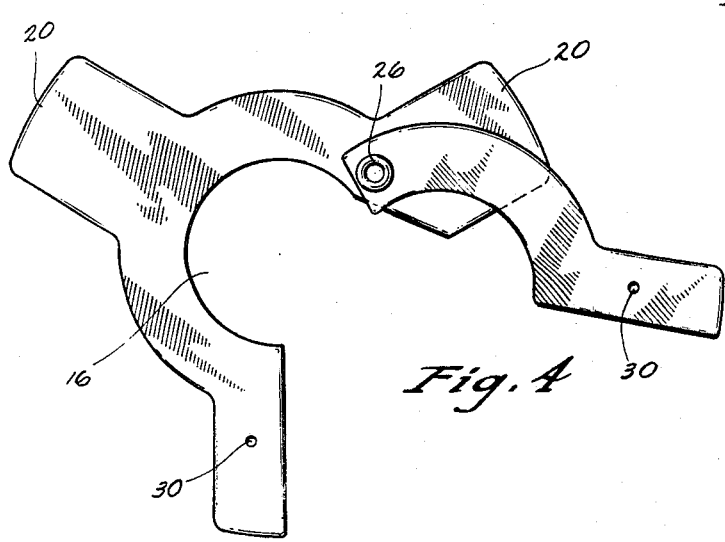
FIG. 4 is a plan view of the collar device with the pivotal portion in its opened position to provide access to the center opening.

In use, it is apparent that the collar device may be readily mounted on the animal's neck by simply pivoting the pivotal portion 22 to the open position of FIG. 4 and after it has been mounted on the neck of the animal the pivotal member 22 is pivoted to its closed position and secured by the staple 32. It is preferable that the device be mounted as illustrated in FIG. 1 with two of the outwardly extending projections 22 extending downwardly and outwardly of the animal's front legs while the third projection extends vertically upwardly thus providing ample space between the downwardly extending projections for the animal to move its legs while walking. However, by the use of three prongs 20, the device will gravitate to the position described since the device's center of gravity is through the center of the circular opening 16 and the collar device is supported on the animal's neck at a point on the inner periphery of the collar. Consequently the device will rotate until it is balanced on the animal's neck and such condition results in the device having two of its three prongs extending downwardly and outwardly of the animal's front legs as seen in FIG. 1. It is to be appreciated that a collar having a uniform radius equal to the radius of the projections would be most impractical as it would greatly hinder the animal in its movement as well as be much more expensive to fabricate than the applicant's unit. Moreover, the pivotal member 22 provides ready access into the opening 16 for mounting the unit on the animal and removing it from the animal.

Some changes may be made in the construction and arrangement of my animal movement controlling device without departing from the real spirit and purpose of my invention, and it is my intention to cover by my claims, any modified forms of structure or use of mechanical equivalents which may be reasonably included within their scope.

I claim:

1. An animal collar for chinchillas and the like adapted to be worn on the neck of such an animal to preclude its passage through openings of a predetermined size, comprising, a collar member having a center opening adapted to receive the neck of an animal, said collar member having an outer edge defining an area substantially larger than the area of said center opening, a plurality of outwardly extending radial projections on the outer edge thereof, and said outwardly extending projections have a length measured from the outer edge of said collar which is substantially greater than the width of said collar measured between its inner and outer edges.

2. The structure of claim 1 wherein said collar member includes a pivotal portion adapted to be moved between a closed position whereby said collar completely encloses said center opening to an open position with said pivotal portion pivoted outwardly of said center opening to provide radial access to said center opening.

3. The structure of claim 1 wherein said collar member includes a pivotal portion adapted to be moved between a closed position whereby said collar completely encloses said center opening to an open position with said pivotal portion pivoted outwardly of said center opening to provide radial access to said center opening and, the outer end of said pivotal portion forming a portion of one of said projections when said pivotal portion is in said closed position.

4. The structure of claim 3 and latch means for locking said pivotal portion in said closed position.

5. An animal collar for chinchillas and the like adapted to be worn on the neck of such an animal to preclude its passage through openings of a predetermined size, comprising, a collar member having a center opening adapted to receive the neck of an animal, said collar member having an outer edge defining an area substantially larger than the area of said center opening, a plurality of outwardly extending radial projections on the outer edge thereof, said collar member includes a pivotal portion adapted to be moved between a closed position whereby said collar completely encloses said center opening to an open position with said pivotal portion pivoted outwardly of said center opening to provide radial access to said center opening and, the outer end of said pivotal portion forming a portion of one of said projections when said pivotal portion is in said closed position, latch means for locking said pivotal portion in said closed position and said pivotal portion is pivoted to said collar member on a radial line extending through another of said projections.

6. The structure of claim 5 wherein said collar member is circular in shape along its inner edge and its outer edge member is circular in shape along its inner edge and its outer edge when said pivotal portion is in said closed position and said outer end of said pivotal member forms substantially half of said one projection.

7. An animal collar for chinchillas and the like adapted to be worn on the neck of such an animal to preclude its passage through openings of a predetermined size, comprising, a disc-like collar member having a center opening adapted to receive the neck of an animal, said collar member having an outer edge defining an area substantially larger than the area of said center opening, a plurality of outwardly extending radial projections on the outer edge thereof, said plurality of projections consist of only three projections substantially symmetrically arranged and substantially spaced apart whereby when said collar is placed on animal's neck one of said projections extends vertically upwardly and the other two projections extend downwardly and outwardly away from the animal's legs which may move between said downwardly extending projections.

8. The structure of claim 7 wherein the center of gravity of said collar is offset from the center of said opening such that when said collar is placed on an animal's neck said collar will rotate to a position with one of said projections extending upwardly and the other two extending downwardly and outwardly away from the animal's legs which may move between said downwardly extending projections.

References Cited

UNITED STATES PATENTS

| 2,690,161 | 9/1954  | Isaac   | 119—15 X |
| 2,956,542 | 10/1960 | Mueller | 119—106  |
| 3,013,530 | 12/1961 | Zeman   | 119—106  |
| 3,036,554 | 5/1962  | Johnson | 119—96   |
| 3,062,183 | 11/1962 | Tate    | 119—15   |
| 3,072,098 | 1/1963  | Boemle  | 119—106  |

OTHER REFERENCES

Chinchilla Sales & Supply Publication, Dec. 9, 1957, p. 29.

ALDRICH F. MEDBERY, *Primary Examiner.*